US011984076B2

United States Patent

Leerentveld et al.

(12) United States Patent
(10) Patent No.: US 11,984,076 B2
(45) Date of Patent: May 14, 2024

(54) DISPLAY PANEL COMPENSATION METHODS

(71) Applicant: Ignis Innovation Inc., Waterloo (CA)

(72) Inventors: Raymond Leerentveld, Palgrave (CA); Daniel Hills, Waterloo (CA); Samer Musa, Burlington (CA)

(73) Assignee: Ignis Innovation Inc., Road Town (VG)

( * ) Notice: Subject to any disclaimer, the term of this patent is extended or adjusted under 35 U.S.C. 154(b) by 0 days.

(21) Appl. No.: 17/844,167

(22) Filed: Jun. 20, 2022

(65) Prior Publication Data

US 2022/0319427 A1 Oct. 6, 2022

Related U.S. Application Data

(63) Continuation of application No. 17/325,281, filed on May 20, 2021, now Pat. No. 11,398,188, which is a continuation of application No. 16/257,314, filed on Jan. 25, 2019, now Pat. No. 11,043,164.

(60) Provisional application No. 62/624,379, filed on Jan. 31, 2018.

(51) Int. Cl.

| | |
|---|---|
| ***G09G 3/3233*** | (2016.01) |
| ***A61G 13/10*** | (2006.01) |
| ***F24F 8/10*** | (2021.01) |
| ***F24F 11/00*** | (2018.01) |
| ***F24F 11/74*** | (2018.01) |
| *F24F 110/10* | (2018.01) |
| *F24F 110/20* | (2018.01) |
| *F24F 110/50* | (2018.01) |
| *F24F 120/10* | (2018.01) |

(52) U.S. Cl.

CPC ......... *G09G 3/3233* (2013.01); *A61G 13/108* (2013.01); *F24F 8/10* (2021.01); *F24F 11/0001* (2013.01); *F24F 11/74* (2018.01); *F24F 2110/10* (2018.01); *F24F 2110/20* (2018.01); *F24F 2110/50* (2018.01); *F24F 2120/10* (2018.01); *G09G 2300/0819* (2013.01); *G09G 2320/0233* (2013.01); *G09G 2320/0276* (2013.01); *G09G 2320/0673* (2013.01)

(58) Field of Classification Search

CPC ......... G09G 3/3233; G09G 2320/0693; G09G 2320/0673; G09G 2320/0271; G09G 2320/0276; G09G 2320/0295; G09G 2320/045; G09G 2320/0233; G09G 2300/0819

See application file for complete search history.

(56) References Cited

U.S. PATENT DOCUMENTS

2001/0055007 A1 12/2001 Miura
2002/0041278 A1 4/2002 Matsueda
2005/0068590 A1 3/2005 Shiota
2007/0013622 A1* 1/2007 Stoops ................ G09G 3/3611 345/84
2007/0236517 A1 10/2007 Kimpe
2008/0167552 A1 7/2008 Bouchevreau
(Continued)

*Primary Examiner* — Christopher E Leiby
(74) *Attorney, Agent, or Firm* — Stratford Group Ltd.

(57) ABSTRACT

What is disclosed are methods of non-uniformity compensation for active matrix light emitting diode device (AMOLED) and other emissive displays. For each pixel, greyscale level offsets for a number of predetermined greyscale drive levels which produce a uniform flat field are determined and used to generate a correction function for the pixel.

28 Claims, 4 Drawing Sheets

(56) References Cited

U.S. PATENT DOCUMENTS

| | | | | |
|---|---|---|---|---|
| 2009/0225105 | A1* | 9/2009 | Park | G09G 3/3688 345/690 |
| 2010/0070777 | A1 | 3/2010 | Salters | |
| 2010/0295874 | A1 | 11/2010 | Liu | |
| 2015/0110412 | A1 | 4/2015 | Li | |
| 2015/0194105 | A1* | 7/2015 | Han | G09G 3/3648 345/89 |
| 2018/0167140 | A1 | 6/2018 | Brandt-Pearce | |
| 2018/0174526 | A1 | 6/2018 | Chesnokov | |
| 2018/0182278 | A1 | 6/2018 | Kim | |
| 2019/0035361 | A1 | 1/2019 | Luo | |
| 2019/0052872 | A1 | 2/2019 | Shyshkin | |
| 2019/0180686 | A1 | 6/2019 | Qu | |
| 2020/0243043 | A1 | 7/2020 | Leerentveld | |
| 2021/0049946 | A1* | 2/2021 | Shan | G09G 3/36 |

* cited by examiner

DISPLAY PANEL COMPENSATION METHODS

CROSS-REFERENCE TO RELATED APPLICATIONS

This application is a continuation of U.S. patent application Ser. No. 17/325,281, filed May 20, 2021, now allowed, which is a continuation of U.S. patent application Ser. No. 16/257,314, filed Jan. 25, 2019, now U.S. Pat. No. 11,043,164, which claims the benefit of US. U.S. Provisional Patent Application No. 62/624,379, filed Jan. 31, 2018, all of which i-s are hereby incorporated by reference herein in its their entirety.

FIELD OF THE INVENTION

The present disclosure relates to compensation of light emissive visual display technology, and particularly to methods for improving display uniformity by measuring and compensating individual pixel luminances for active matrix organic light emitting diode device (AMOLED) and other emissive displays.

BRIEF SUMMARY

According to a first aspect there is provided a method of compensating for non-uniformity of an emissive display panel having pixels, each pixel having a light-emitting device, the method comprising: selecting a plurality of greyscale drive levels representing a significant portion of a usable greyscale drive level range for the display panel; for each pixel, measuring the pixel at each predetermined greyscale drive level; for each predetermined greyscale drive level determining an offset value from the predetermined greyscale drive level for the pixel which creates a uniform flat field with use of said measurements; determining a uniformity correction function with use of said determined offset values; and correcting an input drive level for the pixel with use of the uniformity correction function to compensate for said non-uniformity.

In some embodiments, measuring the pixel comprises taking optical measurements of luminosity with use of at least one of an external optical measurement system and an integrated optical measurement device. In some embodiments, the uniform flat field which is created with the determined offset value for each predetermined greyscale drive level comprises a uniform luminosity produced by each of the pixels of the emissive display panel.

In some embodiments, measuring the pixel comprises taking electrical measurement of the output current of the pixel with use of a monitoring system of the emissive display panel. In some embodiments, the uniform flat field which is created with the determined offset value for each predetermined greyscale drive level comprises a uniform current output by each of the pixels of the emissive display panel.

In some embodiments, determining said offset value with use of said measurements comprises determining said offset value with use of measurements made previously. In some embodiments, determining said offset value with use of said measurements comprises iteratively adjusting an initial offset value from said predetermined greyscale drive level and repeatedly measuring the pixel until reaching the offset value which creates said uniform flat field.

Some embodiments further provide for storing each offset value for each pixel for each predetermined greyscale drive level in a memory of the emissive display panel.

In some embodiments, the number of selected predetermined greyscale drive levels is two and wherein the uniformity correction function is a linear uniformity correction function generated from the offset values for each predetermined greyscale drive level. In some embodiments, said linear uniformity correction function is a function of said input drive level and the offset values for each predetermined greyscale drive level.

In some embodiments, the number of selected predetermined greyscale drive levels N is greater than two and wherein the uniformity correction function is a piecewise linear uniformity correction function generated from the offset values for each predetermined greyscale drive level. In some embodiments, said piecewise linear uniformity correction function is a function of said input drive level and the offset values for each predetermined greyscale drive level.

In some embodiments, the number of selected predetermined greyscale drive levels N is greater than two and wherein the uniformity correction function is a curve fit polynomial uniformity correction function of order N−1 or lower generated from the offset values for each predetermined greyscale drive level. In some embodiments, said polynomial uniformity correction function of order N−1 or lower is a function of said input drive level and said offset values for each predetermined greyscale drive level.

In some embodiments, each light-emitting device comprises an organic light emitting devices (OLED).

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
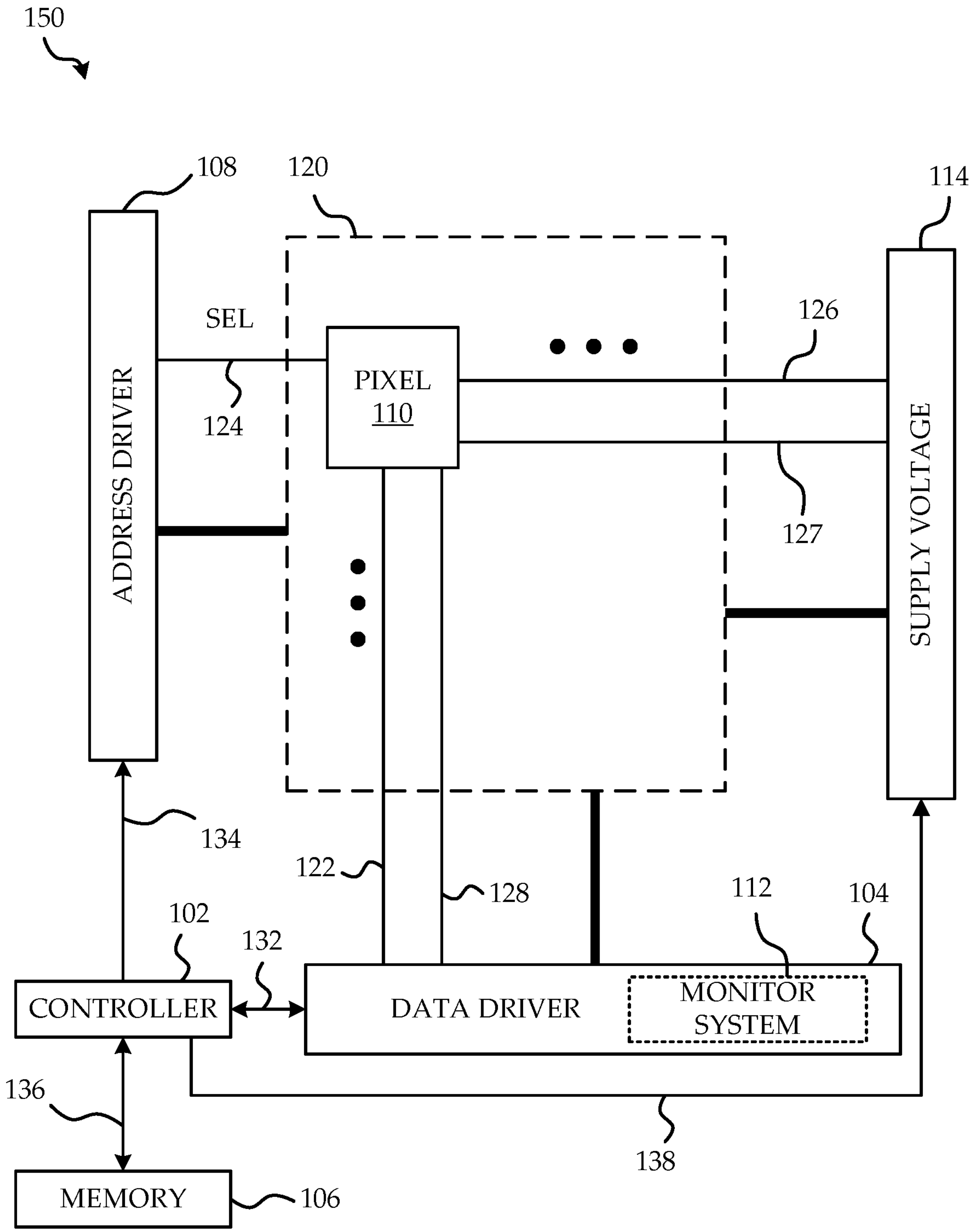
FIG. 1 illustrates an example display system which participates in and whose uniformity is to be improved by the methods disclosed.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Many modern display technologies suffer from defects, variations, and non-uniformities, from the moment of fabrication, and can suffer further from aging and deterioration over the operational lifetime of the display, which result in the production of images which deviate from those which are intended. Optical correction systems and methods can be used, either during fabrication or after a display has been put into use, to measure and correct pixels (and sub-pixels) across the display. To correct for visual defects of the display, the incoming video signal is deliberately modified with compensation data or correction data such that it compensates for those defects. In some approaches, to determine the correction data, first the luminance of each individual panel pixel is measured for a number of greyscale luminance values, and correction values based on producing a desired luminance for each pixel are then determined. Other approaches utilize a combination of one or more of electrical measurements, luminance measurements, and known pixel characteristics along with appropriate algorithms to predict correction values which produce desired luminances. One of the major visual defects of display technologies is non-uniformity across the display, which is perceivable as luminosity or color variations across portions of images that should appear as a flat field.

AMOLED panels in particular are characterized by significant amounts of luminance non-uniformity caused by multiple factors including, TFT threshold variation, OLED voltage and luminance variation, manufacturing tolerances, voltage drop along lines, and contamination and driver output differences, among others. Several measurement technologies may be used to measure the drive in OLED displays and algorithms may be utilized to take these combined effects and correct the image on the display by changing the offset and gain of individual pixels. As described further below, the measurement data used to generate the correction data and correction function can either be collected optically or electrically on the panel. The correction data according to the methods developed and defined herein are applicable for both initial TO (Time Zero) and Tn (Time after Time Zero) corrections. The offset method for uniformity correction outlined below describes how the measured data are utilized to create offset data which is used in a correction function to generate uniform corrected pixel output.

It should be understood that while the embodiments herein have been described in the context of AMOLED displays, the embodiments herein pertain to methods of uniformity correction and compensation and do not limit the display technology underlying their operation and the operation of the displays in which they are implemented. The methods described herein are applicable to any number of various types and implementations of various visual display technologies comprising pixels, including but not limited to light emitting diode displays (LED), electroluminescent displays (ELD), organic light emitting diode displays (OLED), plasma display panels (PSP), microLED or quantum dot displays, among other displays.

FIG. 1 is a diagram of an example display system 150 implementing the methods described further below. The display system 150 includes a display panel 120, an address driver 108, a data driver 104, a controller 102, and a memory storage 106.

The display panel 120 includes an array of pixels 110 (only one explicitly shown) arranged in rows and columns. Each of the pixels 110 is individually programmable to emit light with individually programmable luminance values. The controller 102 receives digital data indicative of information to be displayed on the display panel 120. The controller 102 sends signals 132 to the data driver 104 and scheduling signals 134 to the address driver 108 to drive the pixels 110 in the display panel 120 to display the information indicated.

The plurality of pixels 110 of the display panel 120 thus comprise a display array or display screen adapted to dynamically display information according to the input digital data received by the controller 102. The display screen and various subsets of its pixels define "display areas" which may be used for monitoring and managing display brightness. The display screen can display images and streams of video information from data received by the controller 102. The supply voltage 114 provides a constant power voltage or can serve as an adjustable voltage supply that is controlled by signals from the controller 102. The display system 150 can also incorporate features from a current source or sink (not shown) to provide biasing currents to the pixels 110 in the display panel 120 to thereby decrease programming time for the pixels 110.

For illustrative purposes, only one pixel 110 is explicitly shown in the display system 150 in FIG. 1. It is understood that the display system 150 is implemented with a display screen that includes an array of a plurality of pixels, such as the pixel 110, and that the display screen is not limited to a particular number of rows and columns of pixels. For example, the display system 150 can be implemented with a display screen with a number of rows and columns of pixels commonly available in displays for mobile devices, monitor-based devices, and/or projection-devices. In a multichannel or color display, a number of different types of pixels, each responsible for reproducing color of a particular channel or color such as red, green, blue, or white will be present in the display. Pixels of this kind may also be referred to as "subpixels" as a group of them collectively provide a desired color at a particular row and column of the display, which group of subpixels may collectively also be referred to as a "pixel".

The pixel 110 is operated by a driving circuit or pixel circuit that generally includes a driving transistor and a light emitting device. Hereinafter the pixel 110 may refer to the pixel circuit. The light emitting device can optionally be an organic light emitting diode, but implementations of the present disclosure apply to pixel circuits having other electroluminescence devices, including current-driven light emitting devices and those listed above. The driving transistor in the pixel 110 can optionally be an n-type or p-type amorphous silicon thin-film transistor, but implementations of the present disclosure are not limited to pixel circuits having a particular polarity of transistor or only to pixel circuits having thin-film transistors. The pixel circuit 110 can also include a storage capacitor for storing programming information and allowing the pixel circuit 110 to drive the light emitting device after being addressed. Thus, the display panel 120 can be an active matrix display array.

As illustrated in FIG. 1, the pixel 110 illustrated as the top-left pixel in the display panel 120 is coupled to a select line 124, a supply line 126, a data line 122, and a monitor line 128. A read line may also be included for controlling connections to the monitor line. In one implementation, the supply voltage 114 can also provide a second supply line to the pixel 110. For example, each pixel can be coupled to a first supply line 126 charged with Vdd and a second supply line 127 coupled with Vss, and the pixel circuits 110 can be situated between the first and second supply lines to facilitate driving current between the two supply lines during an emission phase of the pixel circuit. It is to be understood that each of the pixels 110 in the pixel array of the display 120 is coupled to appropriate select lines, supply lines, data lines, and monitor lines. It is noted that aspects of the present disclosure apply to pixels having additional connections, such as connections to additional select lines, and to pixels having fewer connections.

With reference to the pixel 110 of the display panel 120, the select line 124 is provided by the address driver 108, and can be utilized to enable, for example, a programming operation of the pixel 110 by activating a switch or transistor to allow the data line 122 to program the pixel 110. The data line 122 conveys programming information from the data driver 104 to the pixel 110. For example, the data line 122 can be utilized to apply a programming voltage or a programming current to the pixel 110 in order to program the pixel 110 to emit a desired amount of luminance. The programming voltage (or programming current) supplied by the data driver 104 via the data line 122 is a voltage (or current) appropriate to cause the pixel 110 to emit light with a desired amount of luminance according to the digital data received by the controller 102. The programming voltage (or programming current) can be applied to the pixel 110 during a programming operation of the pixel 110 so as to charge a storage device within the pixel 110, such as a storage capacitor, thereby enabling the pixel 110 to emit light with the desired amount of luminance during an emission operation following the programming operation. For example, the storage device in the pixel 110 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 110, the driving current that is conveyed through the light emitting device by the driving transistor during the emission operation of the pixel 110 is a current that is supplied by the first supply line 126 and is drained to a second supply line 127. The first supply line 126 and the second supply line 127 are coupled to the voltage supply 114. The first supply line 126 can provide a positive supply voltage (e.g., the voltage commonly referred to in circuit design as "Vdd") and the second supply line 127 can provide a negative supply voltage (e.g., the voltage commonly referred to in circuit design as "Vss"). Implementations of the present disclosure can be realized where one or the other of the supply lines (e.g., the supply line 127) is fixed at a ground voltage or at another reference voltage.

The display system 150 also includes a monitoring system 112. With reference again to the pixel 110 of the display panel 120, the monitor line 128 connects the pixel 110 to the monitoring system 112. The monitoring system 12 can be integrated with the data driver 104, or can be a separate stand-alone system. In particular, the monitoring system 112 can optionally be implemented by monitoring the current and/or voltage of the data line 122 during a monitoring operation of the pixel 110, and the monitor line 128 can be entirely omitted. The monitor line 128 allows the monitoring system 112 to measure a current or voltage associated with the pixel 110 and thereby extract information indicative of a degradation or aging of the pixel 110 or indicative of a temperature of the pixel 110 or as discussed below measure a current output by the pixel 110 in response to a particular input greyscale drive level. In some embodiments, display panel 120 includes temperature sensing circuitry devoted to sensing temperature implemented in the pixels 110, while in other embodiments, the pixels 110 comprise circuitry which participates in both sensing temperature and driving the pixels. For example, the monitoring system 112 can extract, via the monitor line 128, a current flowing through the driving transistor within the pixel 110 and thereby determine, based on the measured current and based on the voltages applied to the driving transistor during the measurement, a threshold voltage of the driving transistor or a shift thereof.

The controller and 102 and memory store 106 together or in combination with a compensation block (not shown) use compensation data or correction data, in order to address and correct for the various defects, variations, and non-uniformities, existing at the time of fabrication, and optionally, defects suffered further from aging and deterioration after usage. In some embodiments, the correction data includes data for correcting the luminance of the pixels obtained through measurement and processing using an external optical measurement system such as a camera or internal optical feedback such as photodiodes or other integrated optical measuring devices. Some embodiments employ the monitoring system 112 to characterize the behavior of the pixels and to continue to monitor aging and deterioration as the display ages and to update the correction data to compensate for said aging and deterioration over time.

Figure 2:
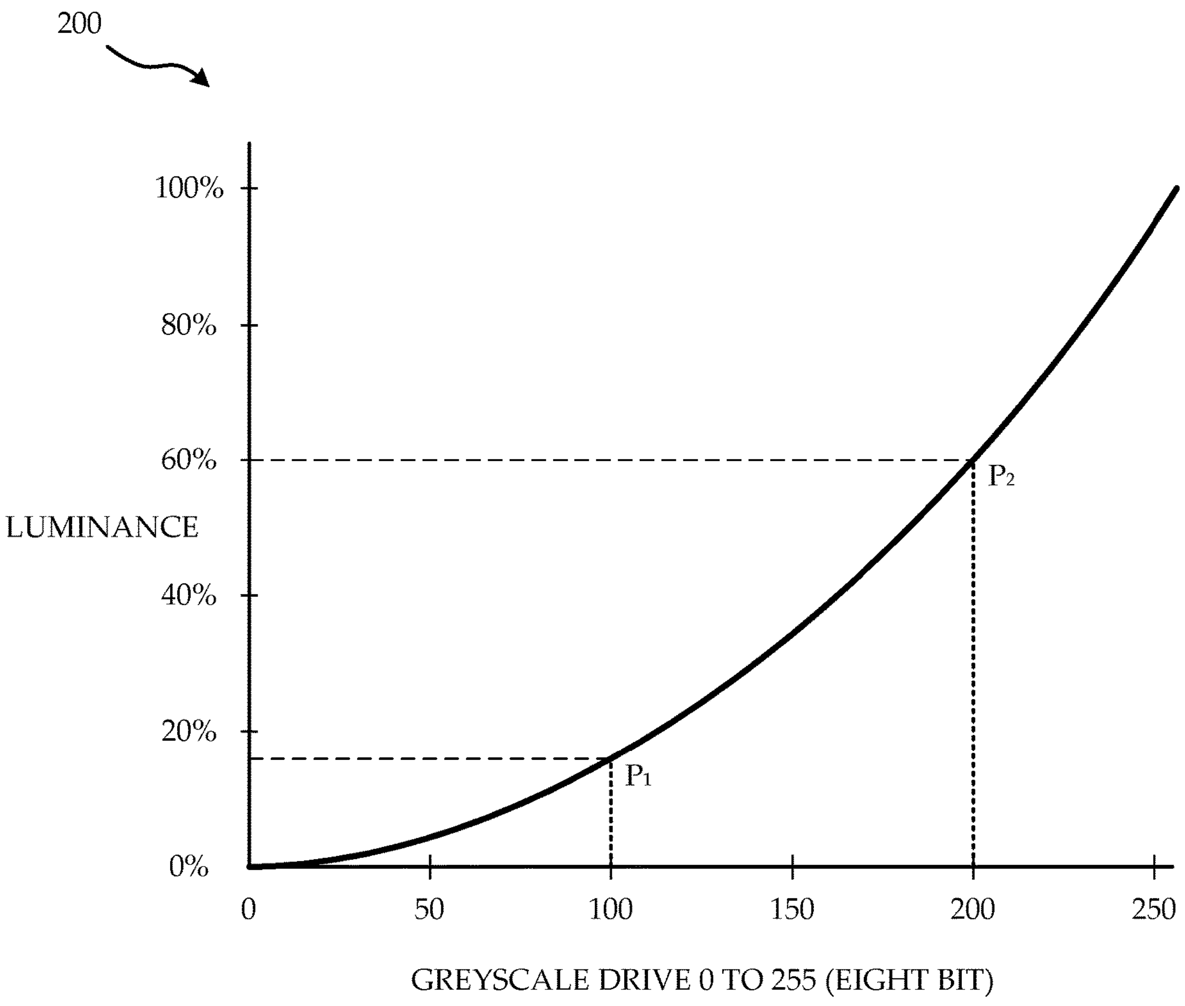
FIG. 2 illustrates a typical response curve of a pixel.

Referring to FIG. 2, a typical pixel luminance response curve 200 will now briefly be described. A typical pixel of an emissive display produces a specific amount of luminance in response to being programmed or driven with a specific greyscale drive level. In systems where 8-bit greyscale values are utilized, the number of greyscale drive levels total 256, namely, 0 to 255. It is to be understood that the methods described herein are equally applicable to display systems utilizing a different number of bits per channel. The luminance produced from these greyscale drive levels, increases from a lower bound of luminance (0%) to some upper bound luminance level (100%) attainable by the pixel as the greyscale drive levels range from 0 to 255. As indicated in the curve of FIG. 2, generally, the pixel luminance response curve 200, rather than being linear, follows a desired gamma function, for example, a gamma of 1.8 or 2.2.

Figure 3:
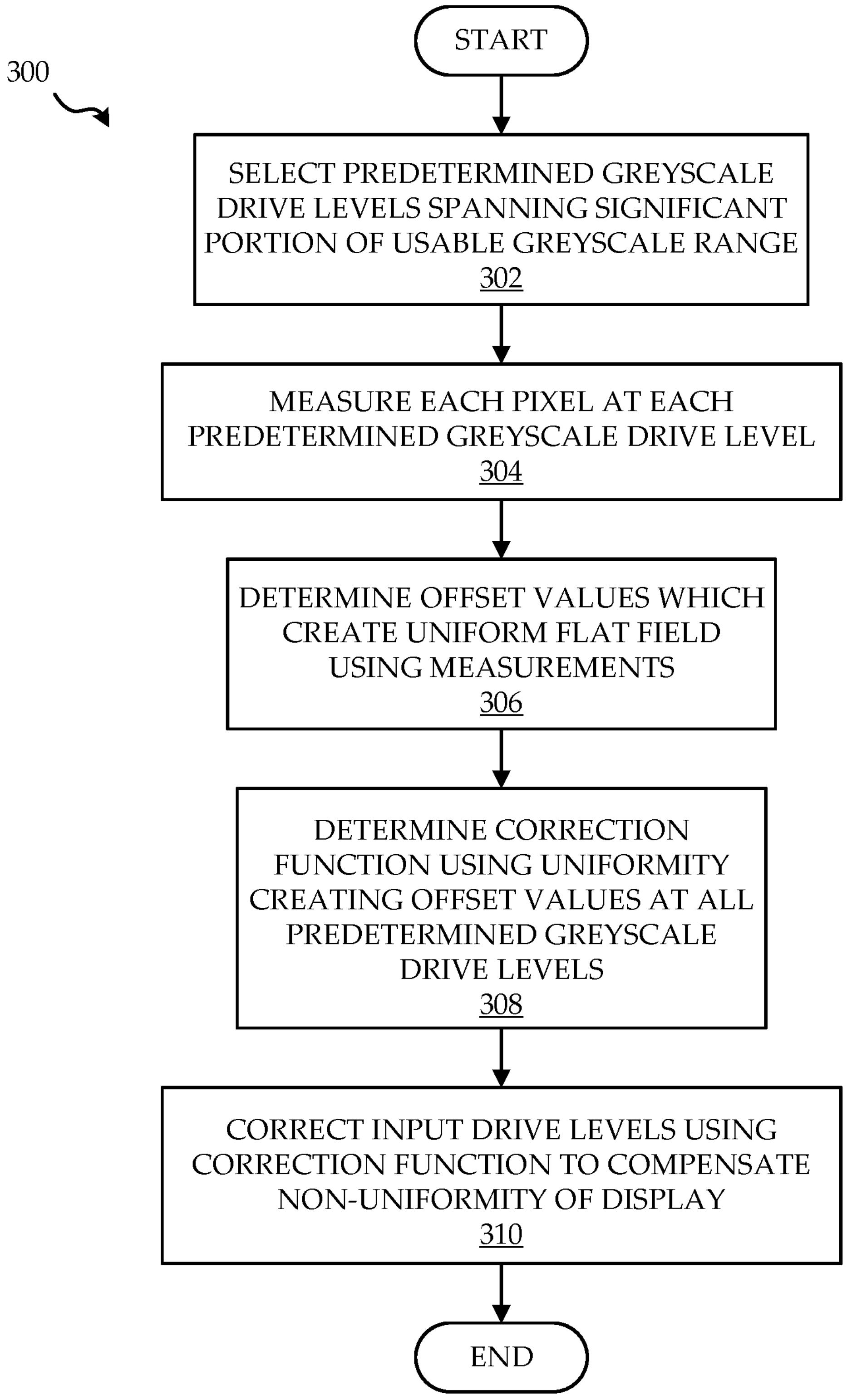
FIG. 3 is a high level functional block diagram of pixel offset uniformity correction.

Referring also to FIG. 3, a pixel offset method of uniformity correction 300 will now be described. A number of predetermined greyscale drive levels ($P_N$) which represent a significant portion of the usable greyscale range on a display panel are selected 302. For example, FIG. 2 depicts two such points $P_1$ and $P_2$ which are at the 100 and 200 greyscale drive level respectively. Although only two predetermined greyscale drive levels are illustrated, in general any number of predetermined greyscale drive levels may be selected. Also, different greyscale drive levels, as long as they span and represent a significant portion of the usable range, may be utilized.

Each pixel is then driven and measured at each predetermined greyscale drive level 304. In some embodiments each pixel's luminance is measured optically while being driven at the predetermined levels, such as by an external optical measuring system such as a camera or by integrated optical detectors such as photodiodes. In other embodiments, a current output of each pixel is measured electrically with use of a monitoring system, while being driven at the predetermined greyscale drive levels. In other embodiments a combination of optical and electrical measurement is utilized.

Offset values which create a uniform flat field are determined from such measurements previously taken or are determined in conjunction with the taking of such measurements 306. The offset value for each pixel at each predetermined greyscale drive level is the deviation in greyscale drive level from that predetermined greyscale drive level for that pixel which is required for the pixels collectively to produce a uniform flat field. Since the offset values which produce a uniform flat field are relative in nature, being determined from the context of all the pixels producing the uniform flat field, any problems which arise from independently attempting to correct each pixel towards some absolute desirable luminance value, which may or may not be attainable by all the pixels, are mitigated and/or avoided. The criteria for what constitutes a uniform flat field can be defined optically in terms of luminance uniformity or based solely on the electrical measurements, e.g. uniformity in the drive current measured electrically.

In some embodiments, the optical and/or electrical measurements of the pixels from the previous step 304 are utilized (optionally in conjunction with known characteristics of the pixels and/or with use of algorithms) to determine what offset values are required for each pixel at each predetermined greyscale drive level to create a uniform flat field. In other embodiments, an iterative approach is utilized. In embodiments with an iterative approach, greyscale drive levels of each pixel are varied away from the predetermined drive levels while measuring the pixels 304, either optically, electrically, or both, until a uniform flat field is obtained, the final pixel offset values being those determined to produce the uniform flat field 306. In either approach, this process results in one array of offsets spanning all the pixels of the display panel, for each predetermined greyscale drive level. It should be noted that due to the offset values' relatively small magnitude, the number of bits required to store offset values for each of the predetermined greyscale drive levels is smaller than what would otherwise be required for storing the uniformity creating greyscale drive level.

For example, in an embodiment with two predetermined greyscale drive levels, such as that illustrated in FIG. 2, the relationship between the uniformity creating drive level (U) and the pixel offset value (O) for each predetermined greyscale drive levels $P_1$ and $P_2$ are as follows:

$$P_1+O_1=U_1 \quad (1)$$

$$P_2+O_2=U_2 \quad (2)$$

Where $O_1$ is the required offset value to the greyscale drive level at predetermined greyscale drive level $P_1$ for the pixel to generate a uniform flat field, which is attained with a uniformity corrected drive level $U_1$ and $O_2$ is the required offset to the greyscale drive level at predetermined greyscale drive level $P_2$ for the pixel to generate a uniform flat field, which is attained with a uniformity corrected drive level $U_2$.

Once the uniformity generating offsets for each pixel are determined 306 and stored in the respective arrays, a correction function for each pixel is determined from them 308 and this function is utilized to correct video data in a manner which compensates the non-uniformity of the display panel 310. Since very few pixels at any one time are being driven exactly at any one of the predetermined greyscale drive levels, some function which interpolates and extrapolates the correction for application to any greyscale drive level of a pixel, is desirable.

Figure 4:
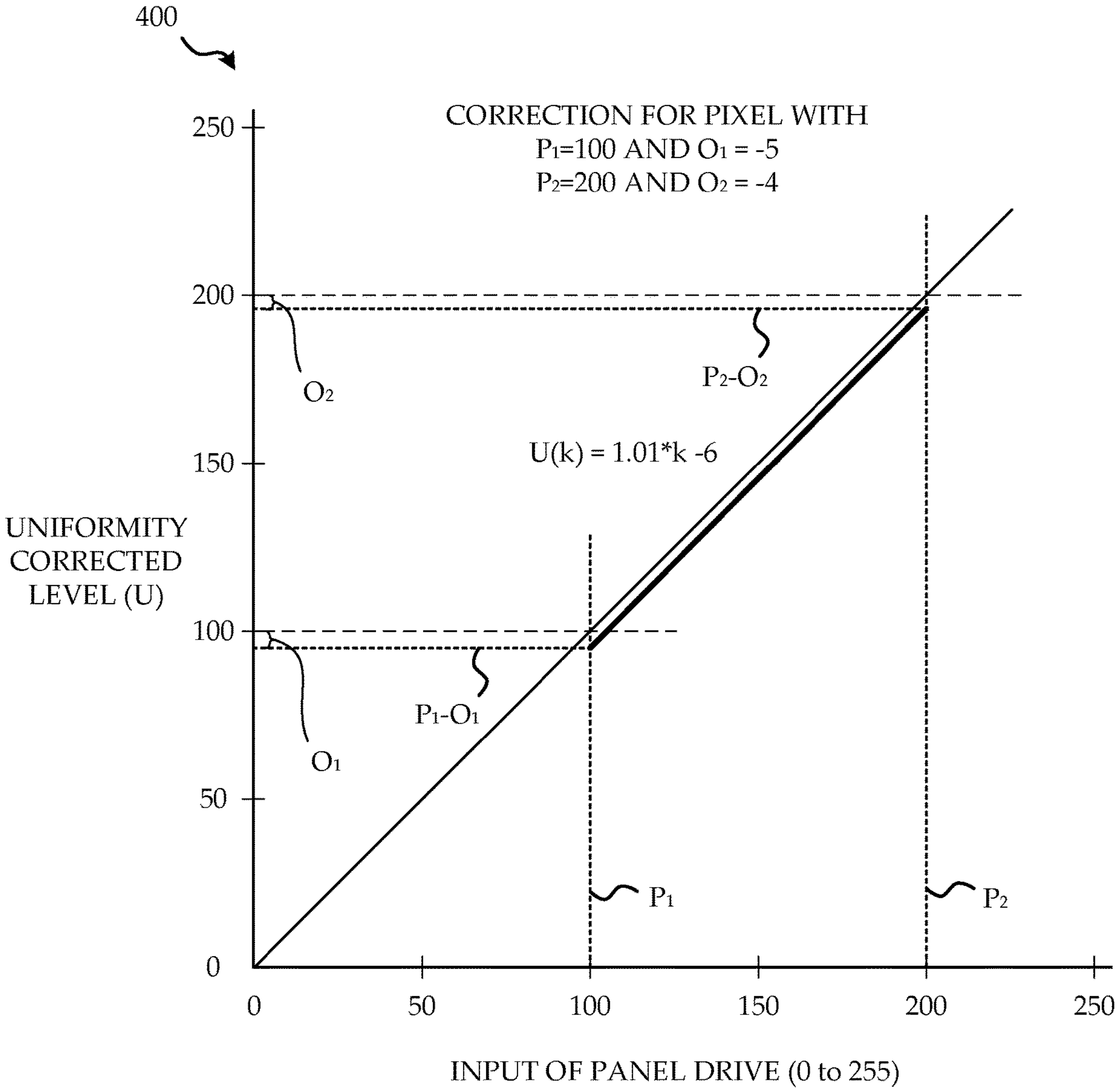
FIG. 4 illustrates linear uniformity compensation using a correction function according to the pixel offset embodiment of FIG. 3.

With reference also to FIG. 4, a uniformity correction function U(k) 400, of the method of FIG. 3 will now be discussed. The example of FIG. 4 illustrates a linear uniformity correction function U(k) 400 determined from an embodiment for which two predetermined greyscale levels $P_1$ and $P_2$, such as those illustrated in FIG. 2, have been selected. At the first predetermined greyscale drive level $P_1=100$, it is determined 304, 306 that an offset $O_1$ equal to −5 is required for that pixel to contribute to a uniform flat field, while at the second predetermined greyscale drive level $P_2=200$, it is determined 304, 306 that an offset $O_2$ equal to −4 is required for the pixel to contribute to a uniform flat field.

As described above, the uniformity correction function U(k) preferably provides a uniformity corrected drive level for every possible input greyscale drive level k. For an embodiment which utilizes two predetermined greyscale drive levels, and hence stores two offset values for each pixel, a linear function which has as its parameters these offsets and the input drive level k may be determined as follows:

$$U(k)=B*k+C \quad (3)$$

Where B is defined as the slope or gain of the linear uniformity correction function U(k) 400 and obtained by:

$$B=((P_2+O_2)-(P_1+O_1))/(P_2-P_1)=(100+O_2-O_1)/100 \quad (4)$$

and where C is defined as the offset of the linear uniformity correction function U(k) 400 and obtained by:

$$C=(P_1+O_1)-B*P_1=100+O_1-100-O_2+O_1=2O_1-O_2 \quad (5)$$

In the specific case illustrated in FIG. 4, the linear uniformity correction function U(k) therefore is:

$$U(k)=(100+O_2-O_1)*k/100+2O_1-O_2 \quad (6)$$

Which for the specific offsets $O_1=-5$ and $O_2=-4$ is evaluated to:

$$U(k)=1.01*k-6 \quad (7)$$

In some embodiments, after a sufficient usage of the display, the pixels are measured again, new offsets are determined 304, 306, and the offsets are used to determine the correction function U(k) 308.

For each pixel, the uniformity correction function U(k) 400 thus represents the linearly extrapolated and interpolated uniformity corrected level for any input greyscale drive level k, using only the stored offsets for the pixel and k as inputs. This function is used to correct the input greyscale drive values to generate greyscale drive values which provide improved uniformity, thereby compensating for non-uniformity of the display 310.

As described above, the number of predetermined greyscale drive levels may be greater than two and can be any number which spans a significant portion of the usable greyscale drive range. For embodiments where the number of predetermined greyscale drive levels N is greater than two in order to account for additional non-linearity in the non-uniformity of the pixel's response, rather than a single linear uniformity creating correction function, a piecewise linear curve fitting may be utilized. In such a case the uniformity correction function U(k) is piecewise linear and expressed only as a function of the offsets $O_1, \ldots O_N$, and the input greyscale drive level, in a manner analogous to that described for the embodiment associated with FIG. 4, but for each "piece" of the piecewise uniformity correction function.

Alternatively, the multiple points $(P_1-O_1, P_1), \ldots (P_N-O_N, P_N))$ determined for an embodiment with N predetermined greyscale levels, may be utilized to generate a curve-fit polynomial, generally of any order between 1 and N−1. In such a case, the determined points generating the curve-fit function are expressed in terms of the offsets, so that the generated polynomial function for each pixel is a function which only requires the offsets for the pixel, obtained from the stored arrays, and the input greyscale drive level k for the pixel, as inputs to generate the uniformity creating greyscale drive level.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of compensating for non-uniformity of a plurality of pixels of a display panel, each pixel having a light-emitting device, the method comprising:

for each pixel of the plurality of pixels, driving and measuring the pixel at a predetermined subset of a plurality of operating greyscale drive levels of the display panel, generating measurements only for the greyscale drive levels of the predetermined subset of the plurality of operating greyscale drive levels;

determining a respective greyscale offset value for each greyscale drive level of the predetermined subset of the plurality of operating greyscale drive levels with use of said measurements;

storing said respective greyscale offset values in a memory for use in correcting input drive levels corresponding to any of the plurality of operating greyscale drive levels including input drive levels corresponding to operating greyscale drive levels outside of the predetermined subset;

determining a uniformity correction function with use of said respective greyscale offset values; and retrieving from the memory the respective greyscale offset values, and correcting an input drive level for the pixel to compensate for said non-uniformity with use of the uniformity correction function, wherein the number of greyscale drive levels of said predetermined subset of the plurality of operating greyscale drive levels is two and wherein the uniformity correction function is a linear uniformity correction function generated from the respective greyscale offset values for each greyscale drive level of said predetermined subset of the plurality of operating greyscale drive levels.

2. The method of claim 1, wherein measuring the pixel comprises taking optical measurements of luminosity with use of at least one of an external optical measurement system and an integrated optical measurement device.

3. The method of claim 1, wherein measuring the pixel comprises taking electrical measurements of an output current of the pixel with use of a monitoring system of the display panel.

4. The method of claim 1, wherein determining said respective greyscale offset value with use of said measurements comprises determining said respective greyscale offset value with use of measurements made previously.

5. The method of claim 1, wherein the predetermined subset of the plurality of operating greyscale drive levels spans at least 40% of a usable greyscale drive level range for the display panel.

6. The method of claim 1, wherein each respective greyscale offset value is stored in an array in the memory.

7. The method of claim 1, wherein each light-emitting device comprises an organic light emitting devices (OLED).

8. The method of claim 1, wherein determining said respective greyscale offset value with use of said measurements comprises iteratively adjusting an initial respective greyscale offset value from each greyscale drive level of said predetermined subset of the plurality of operating greyscale drive levels and repeatedly measuring the pixel until reaching the respective greyscale offset value which creates a uniform flat field.

9. The method of claim 1, wherein determining said respective greyscale offset value for each greyscale drive level of said predetermined subset of the plurality of operating greyscale drive levels comprises determining an offset from that greyscale drive level which creates a uniform flat field.

10. The method of claim 9, wherein the uniform flat field comprises a uniform luminosity produced by each pixel of the plurality of pixels.

11. The method of claim 9, wherein the uniform flat field comprises a uniform current output by each pixel of the plurality of pixels.

12. The method of claim 1, wherein said linear uniformity correction function is a function of said input drive level and the respective greyscale offset values for each greyscale drive level of said predetermined subset of the plurality of operating greyscale drive levels.

13. The method of claim 1, wherein each respective greyscale offset value is stored in the memory using a first bit depth less than a second bit depth used to store each of the plurality of operating greyscale drive levels.

14. The method of claim 13, wherein the first bit depth represents a first greyscale range smaller than a second greyscale range represented by the second bit depth.

15. A method of compensating for non-uniformity of a plurality of pixels of a display panel, each pixel having a light-emitting device, the method comprising:

for each pixel of the plurality of pixels, driving and measuring the pixel at a predetermined subset of a plurality of operating greyscale drive levels of the display panel, generating measurements only for the greyscale drive levels of the predetermined subset of the plurality of operating greyscale drive levels;

determining a respective greyscale offset value for each greyscale drive level of the predetermined subset of the plurality of operating greyscale drive levels with use of said measurements;

storing said respective greyscale offset values in a memory for use in correcting input drive levels corresponding to any of the plurality of operating greyscale drive levels including input drive levels corresponding to operating greyscale drive levels outside of the predetermined subset;

determining a uniformity correction function with use of said respective greyscale offset values; and retrieving from the memory the respective greyscale offset values, and correcting an input drive level for the pixel to compensate for said non-uniformity with use of the uniformity correction function, wherein the number of greyscale drive levels of said predetermined subset of the plurality of operating greyscale drive levels N is greater than two and wherein the uniformity correction function is a curve fit polynomial uniformity correction function of order N−1 or lower generated from the respective greyscale offset values for each greyscale drive level of said predetermined subset of the plurality of operating greyscale drive levels.

16. The method of claim 15, wherein measuring the pixel comprises taking optical measurements of luminosity with use of at least one of an external optical measurement system and an integrated optical measurement device.

17. The method of claim 15, wherein measuring the pixel comprises taking electrical measurements of an output current of the pixel with use of a monitoring system of the display panel.

18. The method of claim 15, wherein determining said respective greyscale offset value with use of said measurements comprises determining said respective greyscale offset value with use of measurements made previously.

19. The method of claim 15, wherein the predetermined subset of the plurality of operating greyscale drive levels spans at least 40% of a usable greyscale drive level range for the display panel.

20. The method of claim 15, wherein each respective greyscale offset value is stored in an array in the memory.

21. The method of claim 15, wherein each light-emitting device comprises an organic light emitting devices (OLED).

22. The method of claim 15, wherein determining said respective greyscale offset value with use of said measurements comprises iteratively adjusting an initial respective greyscale offset value from each greyscale drive level of said predetermined subset of the plurality of operating greyscale drive levels and repeatedly measuring the pixel until reaching the respective greyscale offset value which creates a uniform flat field.

23. The method of claim 15, wherein determining said respective greyscale offset value for each greyscale drive level of said predetermined subset of the plurality of operating greyscale drive levels comprises determining an offset from that greyscale drive level which creates a uniform flat field.

24. The method of claim 23, wherein the uniform flat field comprises a uniform luminosity produced by each pixel of the plurality of pixels.

25. The method of claim 23, wherein the uniform flat field comprises a uniform current output by each pixel of the plurality of pixels.

26. The method of claim 15, wherein said polynomial uniformity correction function of order N−1 or lower is a function of said input drive level and said respective greyscale offset values for each greyscale drive level of said predetermined subset of the plurality of operating greyscale drive levels.

27. The method of claim 15, wherein each respective greyscale offset value is stored in the memory using a first bit depth less than a second bit depth used to store each of the plurality of operating greyscale drive levels.

28. The method of claim 27, wherein the first bit depth represents a first greyscale range smaller than a second greyscale range represented by the second bit depth.

* * * * *